(12) United States Patent
Kim (10) Patent No.: US 9,166,216 B2
(45) Date of Patent: Oct. 20, 2015

(54) RECHARGEABLE BATTERY AND MODULE THEREOF

(71) Applicant: SAMSUNG SDI CO., LTD., Yongin-si, Gyeonggi-do (KR)

(72) Inventor: Duk-Jung Kim, Yongin (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 222 days.

(21) Appl. No.: 13/741,288

(22) Filed: Jan. 14, 2013

(65) Prior Publication Data

US 2013/0273411 A1    Oct. 17, 2013

(30) Foreign Application Priority Data

Apr. 12, 2012    (KR) .................. 10-2012-0037999

(51) Int. Cl.
| | |
|---|---|
| H01M 2/04 | (2006.01) |
| H01M 2/30 | (2006.01) |
| H01M 2/10 | (2006.01) |
| H01M 2/02 | (2006.01) |
| H01M 2/20 | (2006.01) |
| H01M 2/26 | (2006.01) |

(52) U.S. Cl.
CPC .............. *H01M 2/30* (2013.01); *H01M 2/0217* (2013.01); *H01M 2/0237* (2013.01); *H01M 2/043* (2013.01); *H01M 2/0404* (2013.01); *H01M 2/1016* (2013.01); *H01M 2/202* (2013.01); *H01M 2/206* (2013.01); *H01M 2/263* (2013.01); *H01M 2/305* (2013.01)

(58) Field of Classification Search
USPC .......................................... 429/158, 178, 179
See application file for complete search history.

(56) References Cited

U.S. PATENT DOCUMENTS

| | | | | |
|---|---|---|---|---|
| 3,711,335 | A * | 1/1973 | Daniel ........................... | 429/161 |
| 3,874,933 | A * | 4/1975 | Mocas ........................... | 164/119 |
| 4,237,603 | A * | 12/1980 | Crow ............................ | 29/623.4 |
| 4,913,981 | A * | 4/1990 | Hynes et al. ..................... | 429/1 |
| 6,982,131 | B1 * | 1/2006 | Hamada et al. ................. | 429/148 |
| 2003/0091896 | A1 * | 5/2003 | Watanabe et al. .............. | 429/158 |
| 2011/0104562 | A1 * | 5/2011 | Byun et al. ...................... | 429/181 |
| 2011/0206957 | A1 * | 8/2011 | Byun .............................. | 429/56 |
| 2012/0070762 | A1 | 3/2012 | Chung et al. | |

FOREIGN PATENT DOCUMENTS

| | | |
|---|---|---|
| JP | 2011-129310 A | 6/2011 |
| KR | 10-2010-0115540 A | 10/2010 |

* cited by examiner

*Primary Examiner* — Stewart Fraser
*Assistant Examiner* — Olatunji Godo
(74) *Attorney, Agent, or Firm* — Christie, Parker & Hale, LLP (57) ABSTRACT

A rechargeable battery, and a module thereof, including a case accommodating an electrode assembly therein; a cap plate covering an opening of the case and having terminal holes; and electrode terminals installed in the terminal holes and electrically connected to the electrode assembly, the electrode terminals being protruded from lateral surfaces of the case adjacent the opening.

14 Claims, 9 Drawing Sheets

RECHARGEABLE BATTERY AND MODULE THEREOF

CROSS-REFERENCE TO RELATED APPLICATION

This application claims priority to and the benefit of Korean Patent Application No. 10-2012-0037999, filed on Apr. 12, 2012 in the Korean Intellectual Property Office, the entire content of which is incorporated herein by reference.

BACKGROUND

1. Field

Aspects of embodiments of the present invention relate to a rechargeable battery and a module thereof.

2. Description of the Related Art

Unlike a primary battery that is not rechargeable, a rechargeable battery can be recharged and discharged. A small-capacity rechargeable battery is typically used for small portable electronic devices, such as mobile phones, notebook computers, camcorders, and the like, while a large-capacity rechargeable battery may be used as a motor-driving power source, such as for a hybrid vehicle, an electric vehicle, or the like.

For example, a rechargeable battery includes an electrode assembly formed by having a positive electrode and a negative electrode arranged on both surfaces of a separator, a case accommodating the electrode assembly therein, a cap plate hermetically sealing an opening of the case, and electrode terminals penetrating the cap plate and electrically connected to the electrode assembly.

The electrode terminals are installed in a vertical direction on a plane of the cap plate through the cap plate, i.e. in an upward direction in a cell. Namely, the electrode terminals are maintained in a state in which the electrode terminals are protruded upward from the cap plate. Thus, much space is required for the vertically upward direction of the cell, and the number of connection members connecting electrode terminals may be increased in forming a module.

The above information disclosed in this Background section is only for enhancement of understanding of the background of the described technology and therefore it may contain information that does not form the prior art that is already known in this country to a person of ordinary skill in the art.

SUMMARY

According to aspects of embodiments of the present invention, a rechargeable battery, and a module thereof, has a secured upper space in a cell and reduces a number of connection members connecting electrode terminals.

According to an embodiment of the present invention, a rechargeable battery includes: a case accommodating an electrode assembly therein; a cap plate covering an opening of the case and having terminal holes; and electrode terminals installed in the terminal holes and electrically connected to the electrode assembly, the electrode terminals being protruded from lateral surfaces of the case adjacent the opening.

The case may have support recesses formed on the lateral surfaces to support the protruded electrode terminals.

The cap plate may include a planar portion corresponding to the opening of the case, and lateral portions extending from end portions of the planar portion in a direction perpendicular to the planar portion.

The lateral portions may face each other at opposite sides of the planar portion and may have the terminal holes formed therein.

The lateral portions may be connected to the lateral surfaces of the case, and may close support recesses formed on the lateral surfaces to support the electrode terminals.

The rechargeable battery may further include lead tabs connected to uncoated regions of the electrode assembly, the lead tabs corresponding to the lateral portions and connected to inner ends of the electrode terminals.

The rechargeable battery may further include an insulator between the lead tabs and the lateral portions.

The insulator may include first elongated portions extending between the uncoated regions of the electrode assembly and the lateral surfaces of the case.

The insulator may include second elongated portions extending between the planar portion and the electrode assembly.

The electrode terminals may include inner terminal units connected to the lead tabs and extending through gaskets inserted in the terminal holes and outer terminal units connected to the inner terminal units and protruded to the outside of the gaskets.

The electrode terminals may include a first electrode terminal connected to a first electrode of the electrode assembly, and a second electrode terminal connected to a second electrode of the electrode assembly, and the outer terminal unit of the first electrode terminal and the outer terminal unit of the second electrode terminal may be respectively arranged at an upper side and a lower side of each other, each of a lower surface of the outer terminal unit of the first electrode terminal and an upper surface of the outer terminal unit of the second electrode terminal being at a same reference height.

According to another embodiment of the present invention, a rechargeable battery module includes: a plurality of unit cells configured as rechargeable batteries; and at least one of a first connection unit directly connecting a first pair of electrode terminals of the unit cells and a second connection unit connecting a second pair of electrode terminals of the unit cells through a connection member.

The first connection unit may connect the first pair of electrode terminals arranged at a lower side and an upper side of each other in a face-to-face manner through welding, a lower surface of one electrode terminal of the first pair of electrode terminals being at a same reference height and in face-to-face contact with an upper surface of the other electrode terminal of the first pair of electrode terminals.

The second connection unit may connect the second pair of electrode terminals arranged parallel with each other with a height difference therebetween through a connection member, a lower surface of one electrode terminal of the second pair of electrode terminals being at a same reference height as an upper surface of the other electrode terminal of the second pair of electrode terminals. The connection member may have a step.

According to an aspect of embodiments of the present invention, since the electrode terminals are protruded outward from lateral surfaces of the case, an upper space of the rechargeable battery can be secured. According to another aspect of embodiments of the present invention, by directly connecting the electrode terminals protruded from the lateral surfaces of the unit cells, the number of connection members connecting the electrode terminals can be reduced. As such, a rechargeable battery, and a module thereof, according to embodiments of the present invention are suited for application in an electric vehicle or a hybrid electric vehicle.

BRIEF DESCRIPTION OF THE DRAWINGS

The accompanying drawings, together with the specification, illustrate some exemplary embodiments of the present invention, and, together with the description, serve to explain aspects and principles of the present invention.

| Description of Reference Numerals Indicating Some Elements in the Drawings | |
|---|---|
| 10: electrode assembly | 11: first electrode |
| 11a, 12a: coated region | 11b, 12b: uncoated region |
| 12: second electrode | 13: separator |
| 20: case | 21, 22: lateral surface |
| 23, 24: support recess | 30: cap plate |
| 31, 32: lateral portion | 33: planar portion |
| 34: electrolyte injection opening | 35: vent hole |
| 36: sealing stopper | 37: vent plate |
| 37a: notch | 41, 42: first, second electrode terminal |
| 43, 44: gasket | 51, 52: lead tab |
| 61, 62: insulator | 71, 72: first and second connection portion |
| 73: connection member | 101, 102, 103: unit cell |
| 411, 421: inner terminal unit | 412, 422: outer terminal unit |
| 611, 621: first elongated portion | 612, 622: second elongated portion |
| H1, H2: terminal hole | L: reference height |

DETAILED DESCRIPTION

The present invention is described more fully hereinafter with reference to the accompanying drawings, in which some exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
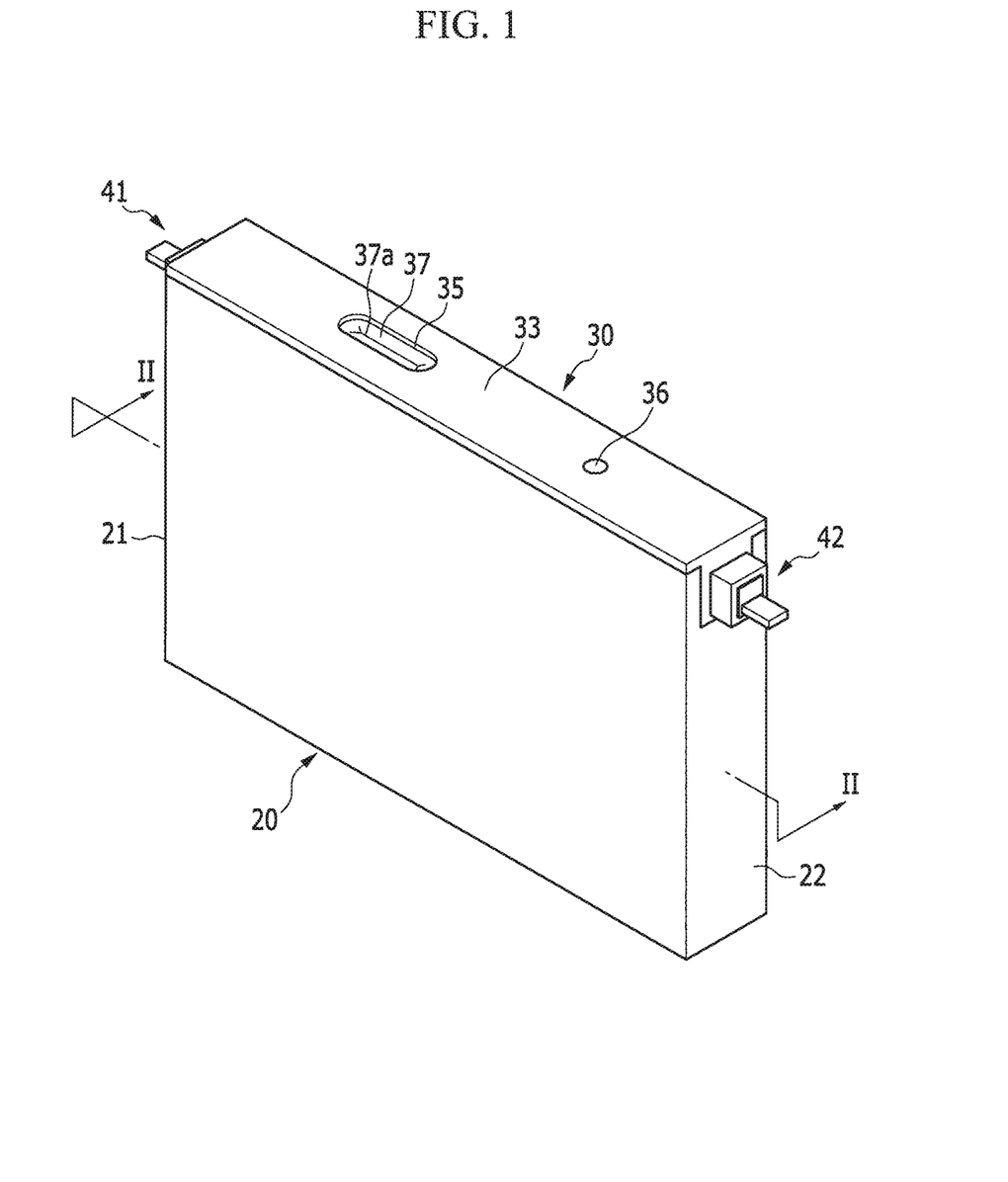
FIG. 1 is a perspective view of a rechargeable battery according to an embodiment of the present invention.
Figure 2:
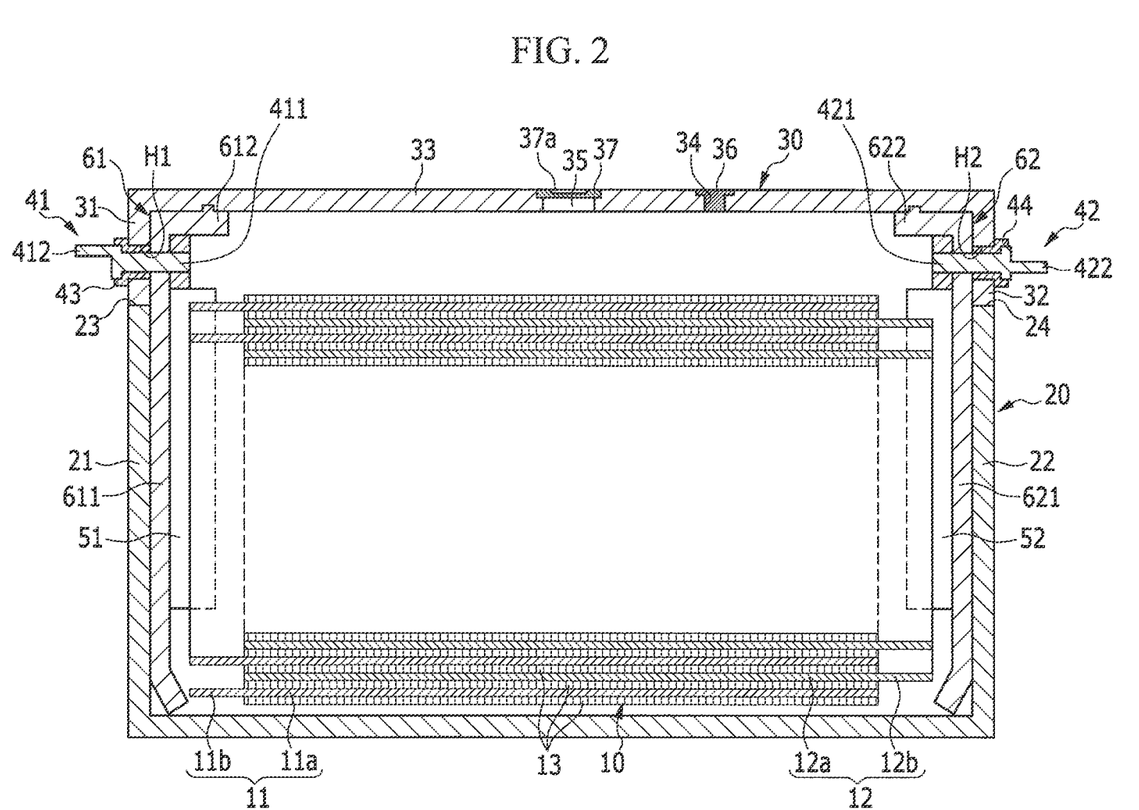
FIG. 2 is a cross-sectional view of the rechargeable battery of FIG. 1, taken along the line II-II.

FIG. 1 is a perspective view of a rechargeable battery according to an embodiment of the present invention, and FIG. 2 is a cross-sectional view of the rechargeable battery of FIG. 1, taken along the line II-II. Referring to FIGS. 1 and 2, a rechargeable battery according to an embodiment of the present invention includes an electrode assembly 10 for performing charging and discharging, a case 20 accommodating the electrode assembly 10 and an electrolyte therein, a cap plate 30 coupled to the case 20 and covering an opening of the case 20, first and second electrode terminals 41 and 42 (e.g., a negative electrode terminal 41 and a positive electrode terminal 42) installed in the cap plate 30 and protruded from lateral surfaces of the case 20, and lead tabs 51 and 52 electrically connecting the first and second electrode terminals 41 and 42 and the electrode assembly 10.

The electrode assembly 10, in one embodiment, is formed by disposing a first electrode 11 (e.g., a negative electrode) and a second electrode 12 (e.g., a positive electrode) on both surfaces of a separator 13 that is an insulator, and winding the laminated first electrode 11, the separator 13, and the second electrode 12 in a jelly roll state. For example, the electrode assembly may be formed by laminating the first electrode and the second electrode configured as a single plate, respectively, with the separator interposed therebetween, or may be formed by folding the first electrode, the separator, and the second electrode in a zigzag manner and laminating the same (not shown).

The first and second electrodes 11 and 12 include coated regions 11a and 12a formed by applying an active material to a current collector of each of the first and second electrodes 11 and 12, and uncoated regions 11b and 12b, i.e. exposed portions of the current collector on which the active material is not applied at one side of each of the coated regions 11a and 12a. In one embodiment, for example, the current collector of the first electrode 11 may be made of copper, and the current collector of the second electrode 12 may be made of aluminum.

The uncoated region 11b of the first electrode 11 is formed at one end portion of the first electrode 11 along the wound first electrode 11. The uncoated region 12b of the second electrode 12 is formed at one end portion of the second electrode 12 along the wound second electrode 12. In one embodiment, the uncoated regions 11b and 12b of the first and second electrodes 11 and 12 are disposed at both ends of the electrode assembly 10 and are mechanically and electrically connected to the respective lead tabs 51 and 52.

Figure 3:
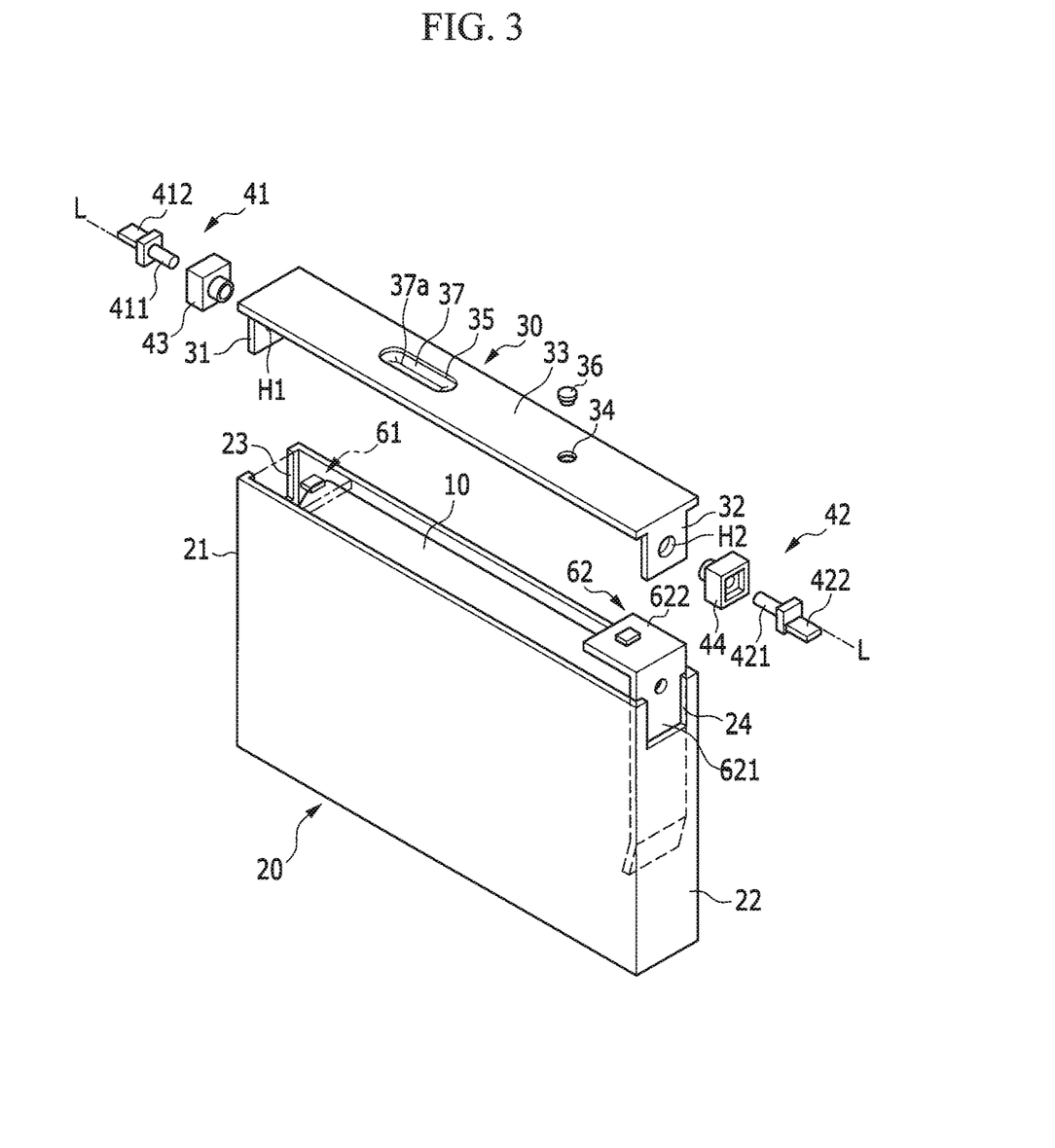
FIG. 3 is a partially exploded perspective view of the rechargeable battery of FIG. 1.

FIG. 3 is a partially exploded perspective view of the rechargeable battery of FIG. 1. Referring to FIGS. 1 through 3, the case 20 has an opening formed at an upper portion thereof and includes a space for accommodating the electrode assembly 10 and an electrolyte. In one embodiment, the electrode assembly 10 may be assembled to the cap plate 30 and inserted into the case 20 through the opening.

In one embodiment, for example, the case 20 may have a bottom formed at a side opposite the opening, and the case 20 may be formed to have a rectangular parallelepiped shape and may include front and rear surfaces (e.g., wide surfaces) having a relatively large area between the opening and the bottom and connected to the bottom, and lateral surfaces 21 and 22 (e.g., narrow surfaces) having a relatively small area between the opening and the bottom and connected to the bottom.

The case 20, in one embodiment, includes support recesses 23 and 24 formed on the lateral surfaces 21 and 22, and the first and second electrode terminals 41 and 42 are protruded outward from the lateral surfaces 21 and 22 of the case 20 through the support recesses 23 and 24, respectively. Since the first and second electrode terminals 41 and 42 are protruded outward from the lateral surfaces 21 and 22, respectively, an upper portion of the rechargeable battery, namely, an upper space of the cap plate 30, can be effectively secured.

In a state in which the electrode assembly 10 is inserted in the case 20, the cap plate 30 is coupled to the case 20 at the opening and at the support recesses 23 and 24 of the lateral surfaces 21 and 22 to seal (e.g., hermetically seal) the accommodation space of the case 20.

In one embodiment, the cap plate 30 includes a planar portion 33 corresponding to the opening of the case 20, and lateral portions 31 and 32 extending from end portions of the planar portion 33 in a direction perpendicular to the planar portion 33. The planar portion 33 is formed to correspond to the opening of the case 20, and the lateral portions 31 and 32 are formed to correspond to the support recesses 23 and 24.

The lateral portions 31 and 32, in one embodiment, are bent from both sides of the planar portion 33 to face each other, close (e.g., hermetically seal) the support recesses 23 and 24 so as to be coplanar with the lateral surfaces 21 and 22 of the case 20, and have terminal holes H1 and H2 for installation of the first and second electrode terminals 41 and 42, respectively.

In one embodiment, as shown in FIGS. 1 through 3, the cap plate 30 has an electrolyte injection opening 34 and a vent hole 35. The electrolyte injection opening 34 serves as a passage for injecting an electrolyte into the case 20 after the cap plate 30 is coupled to the case 20. After the electrolyte is injected, the electrolyte injection opening 34 is sealed by a sealing stopper 36.

The vent hole 35 serves as a discharge passage for expelling gas to the outside of the rechargeable battery when an internal pressure due to the gas generated according to decomposition or degradation of the electrolyte reaches a certain pressure (e.g., a predetermined pressure) when the electrode assembly 10 is charged and discharged. The vent hole 35 is closed (e.g., hermetically closed) by a vent plate 37 which is breakable by the pressure to prevent or substantially prevent an explosion of the rechargeable battery. The vent plate 37, in one embodiment, may be induced to be broken via a notch 37a.

The lead tabs 51 and 52 are connected to the uncoated regions 11b and 12b, respectively, of the electrode assembly 10, and the first and second electrode terminals 41 and 42 are installed in the terminal holes H1 and H2 of the lateral portions 31 and 32 and electrically connected to the lead tabs 51 and 52.

In one embodiment, insulators 61 and 62 are installed between the lead tabs 51 and 52 and the lateral portions 31 and 32, respectively, to electrically insulate the lead tabs 51 and 52 and the lateral portions 31 and 32 of the cap plate 30.

The insulators 61 and 62, in one embodiment, include first elongated portions 611 and 621 extending between the uncoated regions 11b and 12b and the lateral surfaces 21 and 22 of the case 20, respectively. The first elongated portions 611 and 621 electrically insulate the uncoated regions 11b and 12b of the electrode assembly 10 and the lateral surfaces 21 and 22 of the case 20, respectively.

The insulators 61 and 62, in one embodiment, further include second elongated portions 612 and 622 extending between the planar portion 33 and the electrode assembly 10. The second elongated portions 612 and 622 electrically insulate the electrode assembly 10 from the planar portion 33 of the cap plate 30.

Figure 4:
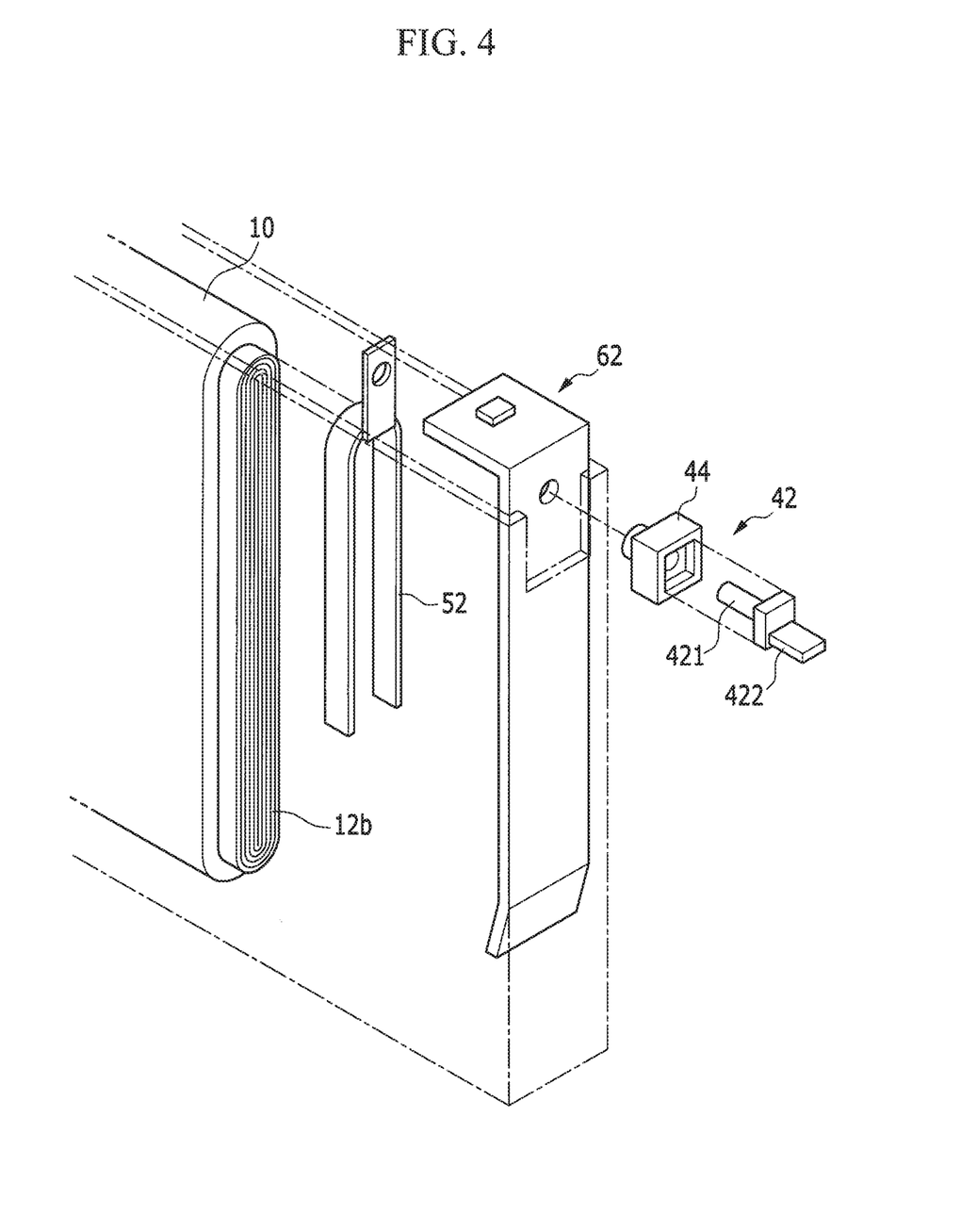
FIG. 4 is a partial exploded perspective view of an electrode assembly and an electrode terminal of the rechargeable battery of FIG. 1.

FIG. 4 is a partial exploded perspective view of the electrode assembly 10 and an electrode terminal of the rechargeable battery of FIG. 1. Referring to FIGS. 2 through 4, the first and second electrode terminals 41 and 42 include inner terminal units 411 and 421 positioned within the case 20, and outer terminal units 412 and 422 positioned outside the case 20.

The inner terminal units 411 and 421, in one embodiment, are installed by penetrating gaskets 43 and 44 inserted in the terminal holes H1 and H2 and are connected to the lead tabs 51 and 52, respectively. The gaskets 43 and 44 electrically insulate the inner terminal units 411 and 421 from the lateral portions 31 and 32 and seal the terminal holes H1 and H2, respectively. The outer terminal units 412 and 422 are connected to the inner terminal units 411 and 421 and protruded to the outside of the gaskets 43 and 44, allowing the rechargeable battery to be connected in series or in parallel.

The inner terminal units 411 and 421 and the lead tabs 51 and 52, in one embodiment, may be mechanically and electrically connected by inserting the inner terminal units 411 and 421 with the insulators 61 and 62 interposed therebetween into through holes of the lead tabs 51 and 52 and caulking or welding end portions of the inner terminal units 411 and 421. In one embodiment, the insulators 61 and 62 include through holes formed on the first elongated portions 611 and 621 to allow the inner terminal units 411 and 421 to be inserted therethrough.

In one embodiment, the inner terminal units 411 and 421 have a same or substantially same structure in the first and second electrode terminals 41 and 42, and the outer terminal units 412 and 422 are disposed at upper and lower sides, respectively, in the first and second electrode terminals 41 and 42, such that the outer terminal units 412 and 422 of adjacent rechargeable batteries may be in contact in a facing manner (see FIG. 6) at a reference height "L" (e.g., a pre-set reference height).

In one embodiment, as shown in FIG. 3, the outer terminal unit 412 of the first electrode terminal 41 is formed at an upper side of the first electrode terminal 41 based on the reference height "L," and the outer terminal unit 422 of the second electrode terminal 42 is formed at a lower side of the second electrode terminal 42 based on the reference height "L." Thus, when the first and second electrode terminals 41 and 42 of adjacent rechargeable batteries are connected in series, the outer terminal units 412 and 422 may be directly connected, thereby reducing the number of connection members.

In one embodiment, the outer terminal unit 412 of the first electrode terminal 41 may be formed at a lower side based on the reference height "L," and the outer terminal unit 422 of the second electrode terminal 42 may be formed at an upper side based on the reference height "L." When the first and second electrode terminals 41 and 42 are connected in parallel, since the outer terminal units may be directly connected, the number of connection members may be reduced.

Figure 5:
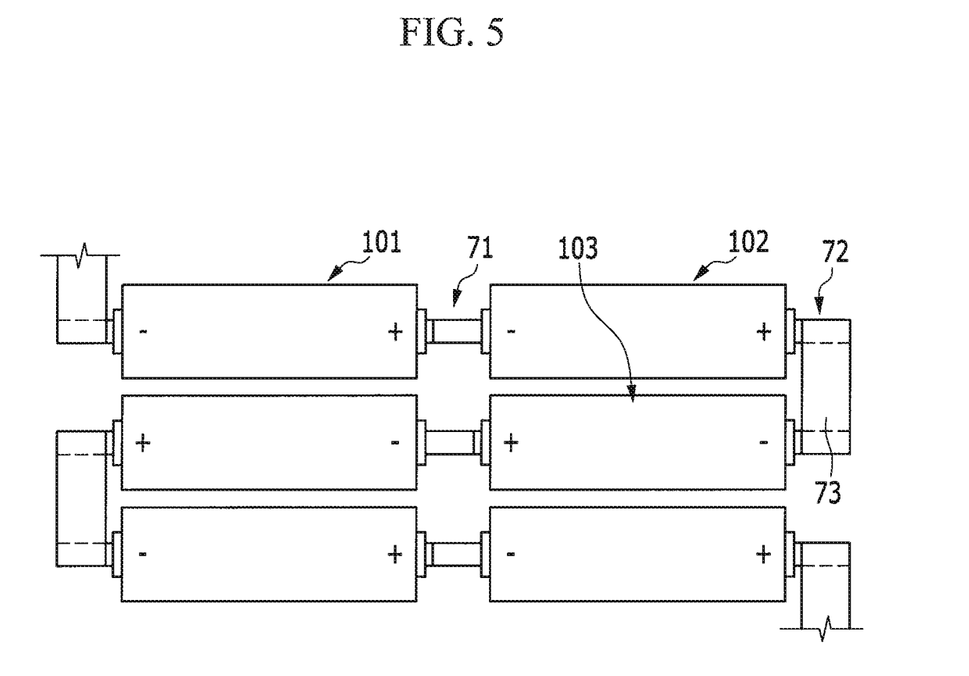
FIG. 5 is a schematic plan view of a rechargeable battery module according to an embodiment of the present invention.

FIG. 5 is a schematic plan view of a rechargeable battery module according to an embodiment of the present invention. Referring to FIG. 5, the rechargeable battery module according to an embodiment of the present invention includes a plurality of unit cells 101, 102, 103 configured as rechargeable batteries, such as the rechargeable battery described above and shown in FIG. 1, and at least one of a first connection unit 71 directly connecting electrode terminals of the unit cells 101 and 102 or a second connection unit 72 connecting electrode terminals of the unit cells 102 and 103 through a connection member 73.

Figure 6:
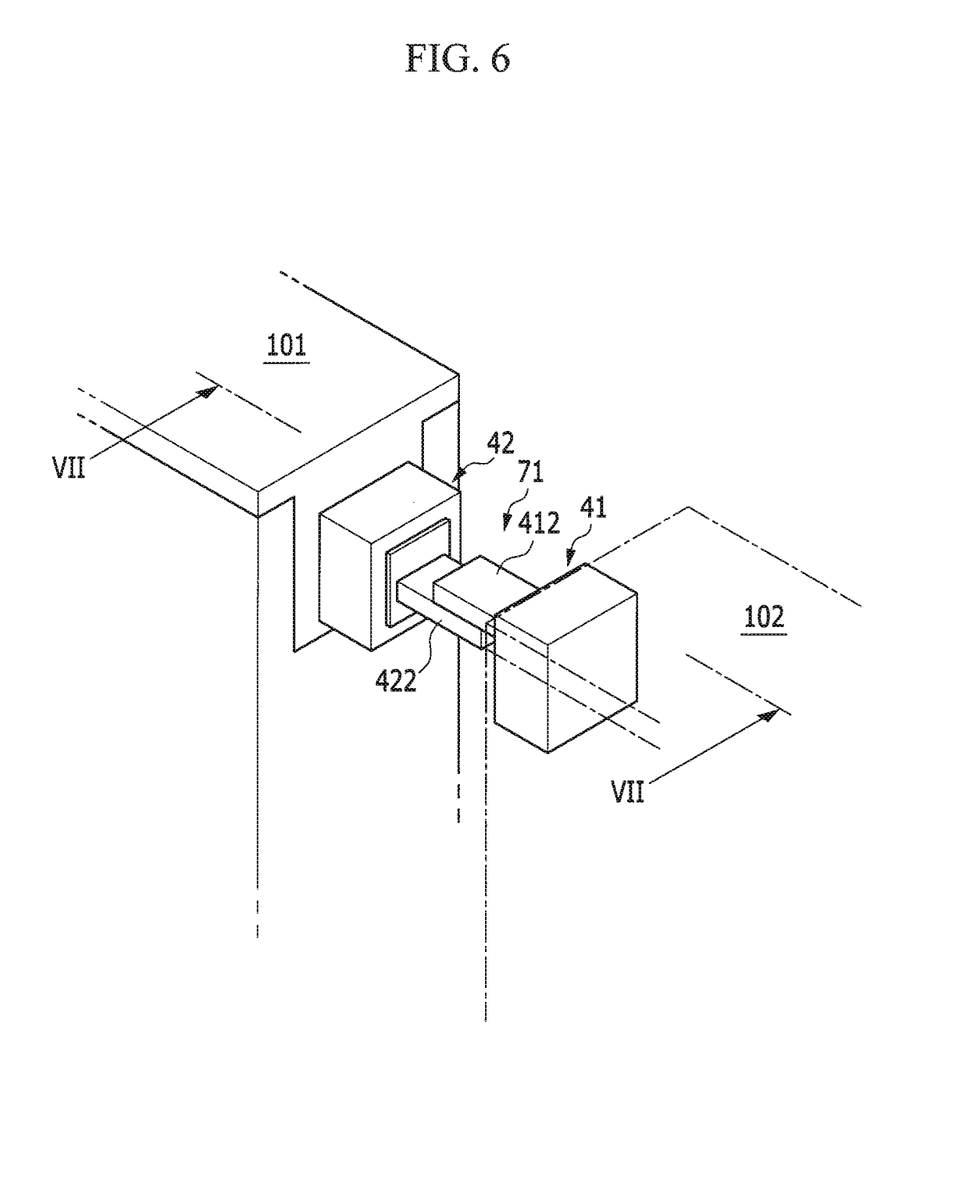
FIG. 6 is a perspective view showing a connection state of a first electrode terminal and a second electrode terminal of unit cells disposed in series in the rechargeable battery module of FIG. 5.
Figure 7:
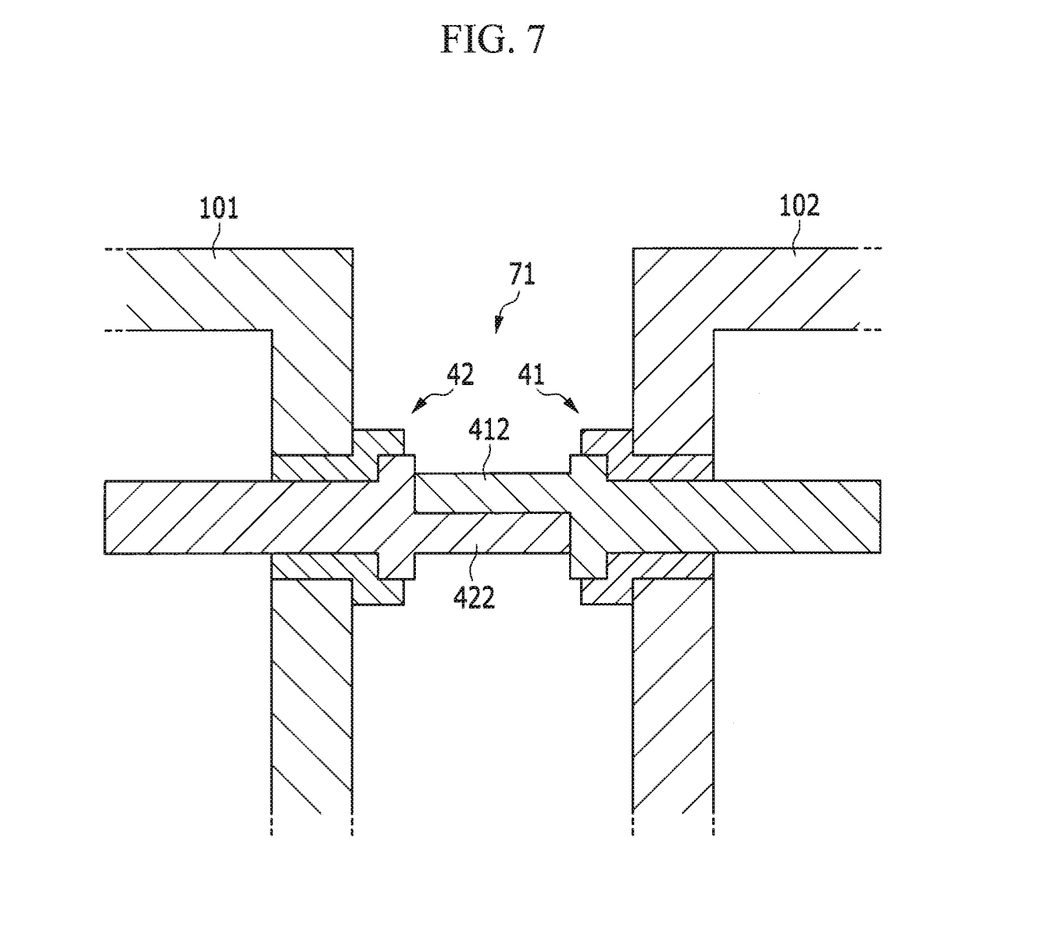
FIG. 7 is a cross-sectional view of the connection state shown in FIG. 6, taken along the line VII-VII.

FIG. 6 is a perspective view showing a connection state of a first electrode terminal and a second electrode terminal of unit cells disposed in series in the rechargeable battery module of FIG. 5, and FIG. 7 is a cross-sectional view of the connection state shown in FIG. 6, taken along the line VII-VII.

In one embodiment, among electrode terminals of the unit cells 101 and 102, the first connection unit 71 directly connects a pair of electrode terminals disposed at upper and lower sides in a facing manner (e.g., in face-to-face contact) in a vertical direction at a reference height (e.g., a pre-set reference height) through welding.

Referring to FIGS. 6 and 7, in one embodiment, the outer terminal unit 422 of the second electrode terminal 42 of the unit cell 101 is disposed at a lower side of the second electrode terminal 42, and the outer terminal unit 412 of the first electrode terminal 41 of the unit cell 102 is disposed at an upper side of the first electrode terminal 41. The outer terminal units 422 and 412 of the second and first electrodes 41 and 42 are arranged, or stacked, in a vertical direction such that the outer terminal units 422 and 412 are in contact (e.g., face-to-face contact), and directly connected through welding. Thus, the first connection unit 71 does not require an additional connection member.

Figure 8:
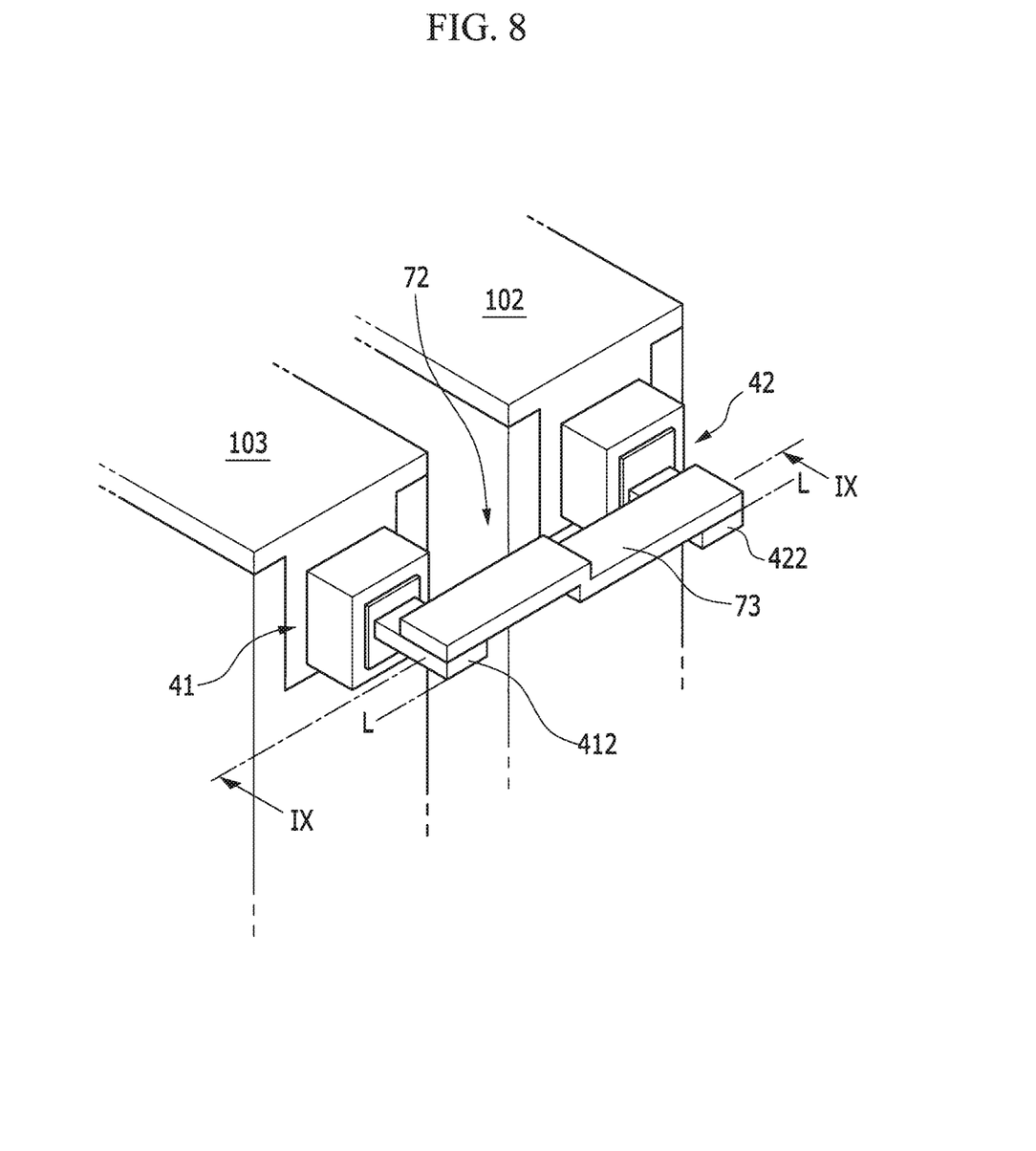
FIG. 8 is a perspective view showing a connection state of a first electrode terminal and a second electrode terminal of unit cells disposed in parallel in the rechargeable battery module of FIG. 5.
Figure 9:
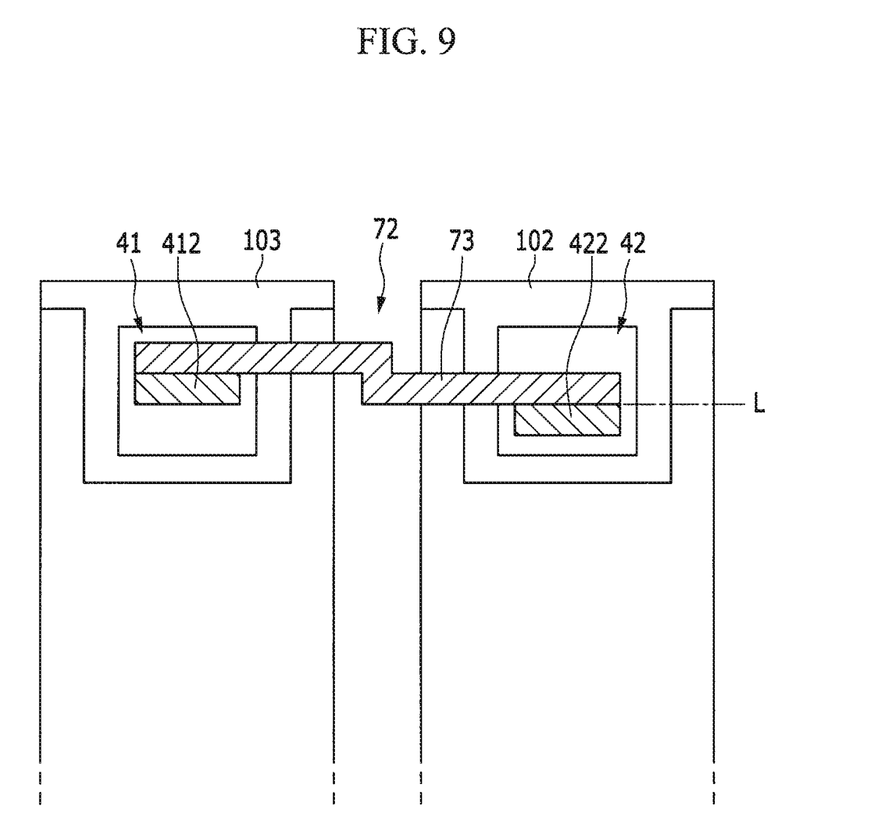
FIG. 9 is a cross-sectional view of the connection state shown in FIG. 8, taken along the line IX-IX.

FIG. 8 is a perspective view showing a connection state of a first electrode terminal and a second electrode terminal of unit cells disposed in parallel in the rechargeable battery module of FIG. 5, and FIG. 9 is a cross-sectional view of the connection state shown in FIG. 8, taken along the line IX-IX.

In one embodiment, among electrode terminals of the unit cells 102 and 103, the second connection unit 72 connects a pair of electrode terminals disposed to be parallel to each other with a height difference through the connection member 73. Both sides of the connection member 73 may be connected to the electrode terminals through welding.

Referring to FIGS. 8 and 9, the outer terminal unit 412 of the first electrode terminal 41 of the unit cell 102 is disposed at a lower side of the first electrode terminal 41 based on the reference height "L," and the outer terminal unit 422 of the second electrode terminal 42 of the unit cell 103 is disposed at an upper side of the second electrode terminal 42 based on the reference height "L." In one embodiment, the outer terminal units 412 and 422 have a height difference and are connected by the connection member 73 having a height difference, such as a step. The connection member 73, in one embodiment, is formed to have a step corresponding to the difference between the heights of the outer terminal units 412 and 422.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
a case accommodating an electrode assembly therein;
a cap plate covering an opening of the case and having terminal holes, the electrode assembly being insertable through the opening in a first direction; and
electrode terminals installed in the terminal holes and electrically connected to the electrode assembly,
wherein the cap plate comprises:
a planar portion corresponding to the opening of the case; and
lateral portions extending away from end portions of the planar portion in the first direction,
wherein the lateral portions face each other at opposite sides of the planar portion and have the terminal holes formed therein, and
wherein the electrode terminals are protruded from the terminal holes in directions transverse to the first direction.

2. The rechargeable battery of claim 1, wherein the case has support recesses formed on lateral surfaces of the case adjacent the opening to support the protruded electrode terminals.

3. The rechargeable battery of claim 1, wherein the lateral portions extend perpendicular to the planar portion.

4. The rechargeable battery of claim 2, wherein the lateral portions are connected to the lateral surfaces of the case, and close support recesses formed on the lateral surfaces to support the electrode terminals.

5. The rechargeable battery of claim 3, further comprising lead tabs connected to uncoated regions of the electrode assembly, the lead tabs corresponding to the lateral portions and connected to inner ends of the electrode terminals.

6. The rechargeable battery of claim 5, further comprising an insulator between the lead tabs and the lateral portions.

7. The rechargeable battery of claim 6, wherein the insulator comprises first elongated portions extending between the uncoated regions of the electrode assembly and the lateral surfaces of the case.

8. The rechargeable battery of claim 6, wherein the insulator comprises second elongated portions extending between the planar portion and the electrode assembly.

9. The rechargeable battery of claim 5, wherein the electrode terminals comprise:
inner terminal units connected to the lead tabs and extending through gaskets inserted in the terminal holes; and
outer terminal units connected to the inner terminal units and protruded to the outside of the gaskets.

10. The rechargeable battery of claim 9, wherein the electrode terminals comprise:
a first electrode terminal connected to a first electrode of the electrode assembly; and
a second electrode terminal connected to a second electrode of the electrode assembly,
wherein the outer terminal unit of the first electrode terminal and the outer terminal unit of the second electrode terminal are respectively arranged at an upper side and a lower side of each other, each of a lower surface of the outer terminal unit of the first electrode terminal and an upper surface of the outer terminal unit of the second electrode terminal being at a same reference height.

11. A rechargeable battery module comprising:
a plurality of unit cells configured as rechargeable batteries, each comprising:
a case accommodating an electrode assembly therein; and
electrode terminals electrically connected to the electrode assembly and protruding from lateral surfaces of the case,
wherein first and second electrode terminals of a first pair of electrode terminals of the unit cells are directly connected to each other, wherein the first electrode terminal of the first pair of electrode terminals protrudes from a first lateral surface of the lateral surfaces of a first unit cell of the unit cells, and the second electrode terminal of the first pair of electrode terminals protrudes from a second lateral surface of the lateral surfaces of a second unit cell of the unit cells, the second lateral surface facing the first lateral surface, and
wherein the first and second electrode terminals of the first pair of electrode terminals are arranged at a lower side and an upper side of each other in a face-to-face manner and directly connected to each other, a lower surface of one of the first and second electrode terminals of the first pair of electrode terminals being at a same reference height and in face-to-face contact with an upper surface of the other of the first and second electrode terminals of the first pair of electrode terminals.

12. The rechargeable battery module of claim 11, wherein the first and second electrode terminals of the first pair of electrode terminals are directly connected to each other through welding.

13. The rechargeable battery module of claim 11, further comprising a connection member connecting a second pair of electrode terminals arranged parallel with each other with a height difference therebetween, a lower surface of one electrode terminal of the second pair of electrode terminals being at a same reference height as an upper surface of the other electrode terminal of the second pair of electrode terminals.

14. The rechargeable battery module of claim 13, wherein the connection member has a step.

* * * * *